United States Patent
Murota et al.

(10) Patent No.: US 10,286,506 B2
(45) Date of Patent: May 14, 2019

(54) TOOL EXCHANGER

(71) Applicant: FANUC Corporation, Yamanashi (JP)

(72) Inventors: Masahiro Murota, Yamanashi (JP); Gaku Isobe, Yamanashi (JP); Yasuyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/606,507

(22) Filed: Jan. 27, 2015

(65) Prior Publication Data

US 2015/0209924 A1    Jul. 30, 2015

(30) Foreign Application Priority Data

Jan. 28, 2014 (JP) ................................. 2014-013772

(51) Int. Cl.
*B23Q 16/06* (2006.01)
*B23Q 3/155* (2006.01)

(52) U.S. Cl.
CPC .......... *B23Q 3/15526* (2013.01); *B23Q 16/06* (2013.01); *B23Q 2220/002* (2013.01); *Y10T 483/1882* (2015.01)

(58) Field of Classification Search
CPC ............... B23Q 16/06; B23Q 3/15526; B23Q 2220/002
USPC ...................................................... 74/813 C
See application file for complete search history.

(56) References Cited

U.S. PATENT DOCUMENTS

| | | | | |
|---|---|---|---|---|
| 4,422,352 A * | 12/1983 | Boffelli | ............... | B23Q 16/102 74/813 L |
| 4,442,392 A * | 4/1984 | Hore | ......................... | H02P 8/30 310/77 |
| 5,222,625 A * | 6/1993 | Reinken | ................... | B23Q 7/08 221/113 |
| 5,663,886 A * | 9/1997 | Lueck | ................ | G05B 19/4069 700/180 |
| 5,674,170 A * | 10/1997 | Girardin | ............ | B23Q 3/15526 211/1.55 |
| 5,675,094 A * | 10/1997 | Klauber | ............... | B60G 17/019 73/862.191 |
| 6,609,441 B1 * | 8/2003 | Sugimoto | ............... | B23B 3/168 29/40 |
| 7,501,811 B2 | 3/2009 | Ono | | |
| 7,619,376 B2 * | 11/2009 | Hiroe | ........................ | H01H 5/02 200/17 B |

(Continued)

FOREIGN PATENT DOCUMENTS

| | | |
|---|---|---|
| CN | 102806494 A | 12/2012 |
| JP | 54102673 A * | 8/1979 |

(Continued)

OTHER PUBLICATIONS

Decision to Grant a Patent dated Jun. 16, 2015, corresponding to Japanese patent application No. 2014-013772.

(Continued)

*Primary Examiner* — Vicky A Johnson
(74) *Attorney, Agent, or Firm* — Hauptman Ham, LLP

(57) ABSTRACT

A tool exchanger includes a variation detection unit configured to detect a variation periodically generated by turning operation of a turret; and a turret phase detection unit configured to set a tool indexing reference phase of the turret based on a detection result from the variation detection unit.

18 Claims, 6 Drawing Sheets

(56) References Cited

U.S. PATENT DOCUMENTS

| | | | |
|---|---|---|---|
| 9,533,391 B2* | 1/2017 | Murota | B23Q 3/15526 |
| 2004/0029691 A1* | 2/2004 | Maeda | B23Q 3/15526 |
| | | | 483/38 |
| 2008/0110307 A1 | 5/2008 | Kong et al. | |

FOREIGN PATENT DOCUMENTS

| | | | |
|---|---|---|---|
| JP | 62259939 A | * | 11/1987 |
| JP | 9-253967 A | | 9/1997 |
| JP | 2010-099766 A | | 5/2010 |

OTHER PUBLICATIONS

Office Action in CN Application No. 201510042032.2, dated Feb. 22, 2017.

* cited by examiner

VIEWED IN DIRECTION OF ARROW A

FIG. 4
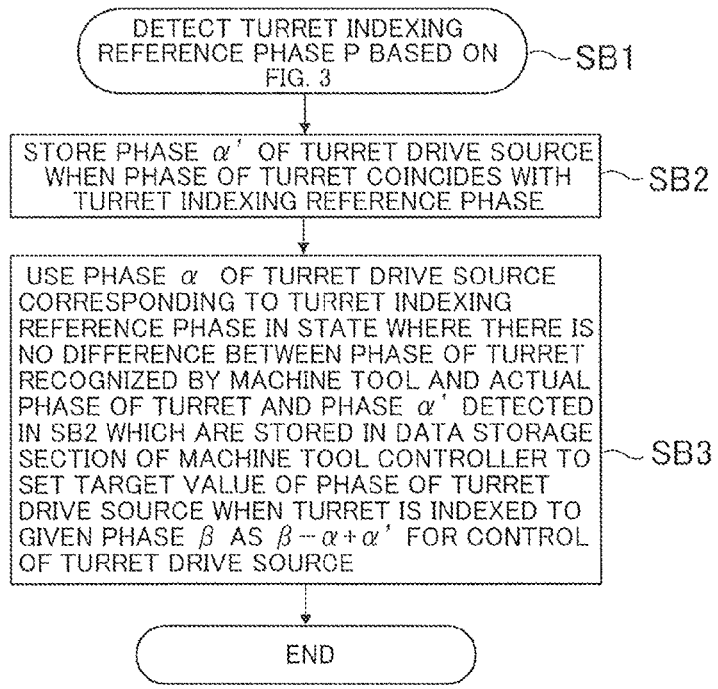
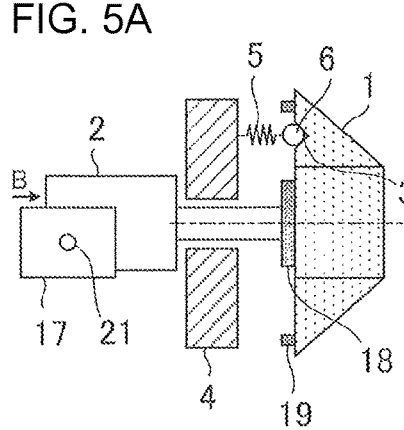
FIG. 5A
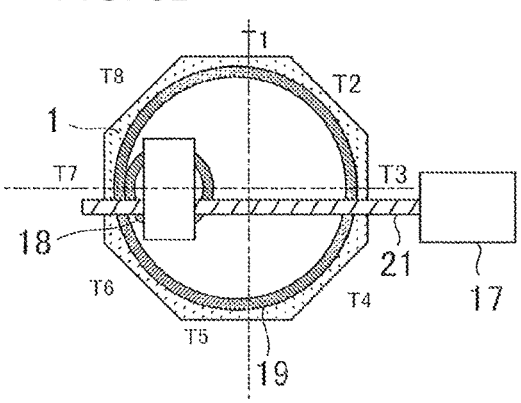
FIG. 5B
VIEWED IN DIRECTION OF ARROW B

VIEWED IN DIRECTION OF ARROW B

FIG. 8A
FIG. 8B
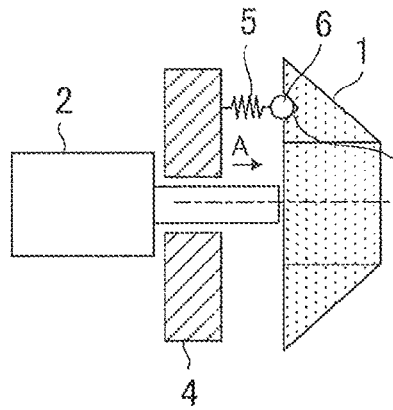
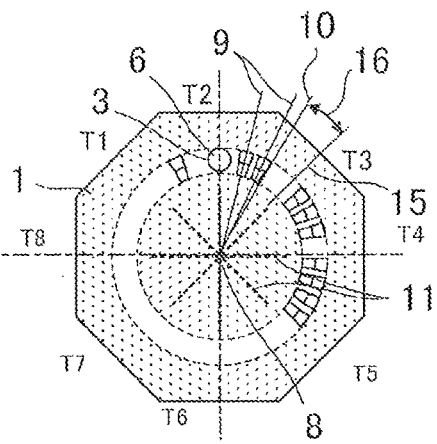
VIEWED IN DIRECTION OF ARROW A
FIG. 9
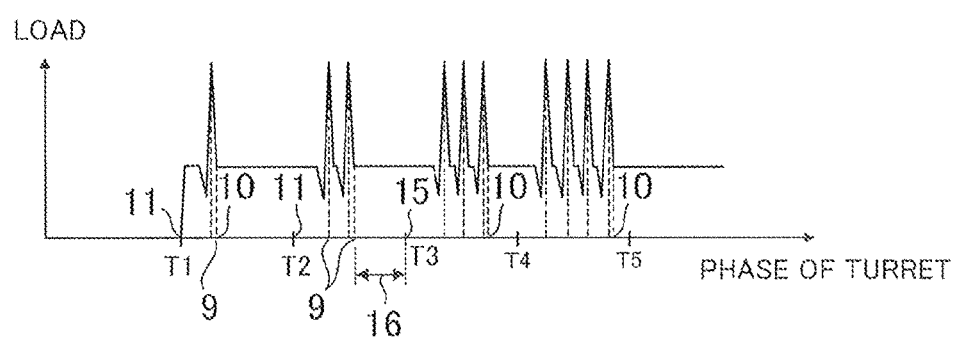

TOOL EXCHANGER

RELATED APPLICATIONS

The present application claims priority to Japanese Application Number 2014-013772, filed Jan. 28, 2014, the disclosure of which is hereby incorporated by reference herein in its entirety.

BACKGROUND OF THE INVENTION

Field of the Invention

The present invention relates to a tool exchanger and, more particularly, to a tool exchanger that performs tool indexing by turning of a turret.

Description of the Related Art

A tool exchanger for automatically exchanging a tool mounted to a main shaft of a machine tool has been conventionally used. The tool exchanger, in which a plurality of tools necessary for work are previously set, is configured to automatically exchange a tool currently mounted to the main shaft of the machine tool with a tool specified according to a processing state.

As a machine tool provided with such an automatic tool exchanger, there is known one including a turret having a plurality of grips for gripping tools as disclosed in JP 2010-99766 A.

Generally, in the machine tool provided with a conventional automatic tool exchanger as disclosed in JP 2010-99766 A, a controller of the machine tool recognizes only a position or a phase of a turret drive source and does not directly recognize an actual position of the turret.

In the machine tool provided with a conventional automatic tool exchanger as disclosed in JP 2010-99766 A, not the actual turret, but only the position or phase of the turret drive source is recognized, that is, the actual position of the turret is not recognized. When chips are bitten in a mechanism part for transmitting power from the turret drive source to turret, a part of the power from the turret drive source may fail to be transmitted to the turret. In this case, even when a controller of the machine tool instructs the turret drive source to drive the turret by a predetermined amount, a part of the power from the turret drive source is not used for turning operation of the turret to cause a deviation between the turret drive source and turret, which may cause a difference between a phase of the turret that the controller of the machine tool recognizes based on a position of the turret drive source and an actual phase of the turret.

When the difference occurs between the phase of the turret recognized by the controller of the machine tool and actual phase of the turret in the conventional machine tool, it is necessary for a skilled person to change the actual phase of the turret so as to eliminate the difference or to re-input a value to the machine tool such that the phase recognized by the machine tool coincides with the actual phase of the turret. Thus, when the difference occurs between the above two phases, the turret of the machine tool cannot be brought into normal turning operation until a skilled person who can perform appropriate treatment finishes the work of coinciding the above two phases. Further, if an operator is not a person skilled in the work, it takes much time for restoration, which may prevent operation from being adequately carried out.

SUMMARY OF THE INVENTION

An object of the present invention is therefore to provide a tool exchanger capable of easily making a difference between the phase of the turret recognized by the controller and actual phase of the turret coincide with each other.

A tool exchanger according to the present invention is provided with a turret and a turret drive source for turning the turret and configured to transmit an output of the turret drive source to the turret and bring the turret into turning operation for tool indexing. The tool exchanger includes: a variation detection unit configured to detect a variation periodically generated by the turning operation of the turret; and a turret phase detection unit configured to set a tool indexing reference phase of the turret based on a detection result from the variation detection unit.

Even if a difference between the phase of the turret recognized by the machine toll controller and actual phase of the turret occurs, the turret indexing reference phase can be detected by bringing the turret into turning operation to detect a variation periodically generated in a predetermined phase during the turning operation.

The tool exchanger may include a load variation mechanism for varying a load of the turret drive source in a predetermined phase during the turning operation of the turret, and the variation detection unit may include a load detection unit configured to detect the load of the turret drive source varied by the load variation mechanism.

The variation mechanism for varying a load of the turret drive source as the variation periodically generated in a predetermined phase is provided. The load of the turret drive source forcibly varied by the load variation mechanism is detected, whereby the turret indexing reference phase can be detected more reliably.

The tool exchanger further may include a vibration variation mechanism for varying a vibration mode in a predetermined phase, and the variation detection unit may include a vibration detection unit configured to detect the vibration varied by the vibration variation mechanism.

The vibration variation mechanism for periodically varying a vibration mode in a predetermined phase is provided. By detecting the vibration periodically varied by the vibration variation mechanism, the turret indexing reference phase can be detected more reliably.

The tool exchanger may further include: a controller configured to control operation of the turret drive source; a turret drive source reference phase storage unit configured to store a phase of the turret drive source when a phase of the turret coincides with a tool indexing reference phase in a state where there is no difference between a phase of the turret recognized by the controller and an actual phase of the turret; a turret drive source phase difference calculation unit configured to calculate a difference between the phase of the turret drive source corresponding to the tool indexing reference phase of the turret detected by the turret phase detection unit and the reference phase of the turret drive source; and a correction unit configured to correct the phase difference with respect to a target position when the turret is indexed to a predetermined phase.

A difference between the phase of the turret drive source corresponding to the turret indexing reference phase in a state where there is no difference between the phase of the turret recognized by the machine tool and actual phase of the turret and phase of the turret drive source corresponding to the turret indexing reference phase after generation of the difference between the phase of the turret recognized by the machine tool and actual phase of the turret is calculated, and the calculated difference is corrected with respect to a target value when the turret is indexed to a predetermined phase, whereby the phase of the turret recognized by the machine tool and actual phase of the turret can be automatically made to coincide with each other.

The tool exchanger may include: a controller configured to control operation of the turret drive source; a turret drive source reference phase storage unit configured to store a phase of the turret drive source when a phase of the turret coincides with a tool indexing reference phase in a state where there is no difference between a phase of the turret recognized by the controller and an actual phase of the turret; a turret drive source phase difference calculation unit configured to calculate a difference between the phase of the turret drive source corresponding to the tool indexing reference phase of the turret detected by the turret phase detection unit and the reference phase of the turret drive source; an output stop unit configured to stop transmission of an output from the turret drive source to the turret; and an adjustment unit configured to rotate the turret drive source by the phase difference in a state where the transmission of an output from the turret drive source to the turret is stopped by the output stop unit.

A difference between the phase of the turret drive source corresponding to the turret indexing reference phase in a state where there is no difference between the phase of the turret recognized by the machine tool and actual phase of the turret and phase of the turret drive source corresponding to the turret indexing reference phase after generation of the difference between the phase of the turret recognized by the machine tool and actual phase of the turret is calculated, and the calculated difference is added for turning of the turret by the turret drive source. Then, with the output of the turret drive source kept from being transmitted to as the power for turning the turret, the phase of the turret drive source is set back to a phase before addition of the phase difference to thereby eliminate a deviation caused in the turret, whereby the phase of the turret recognized by the machine tool and actual phase of the turret can be automatically made to coincide with each other.

The tool exchanger may include: a controller configured to control operation of the turret drive source; a turret drive source reference phase storage unit configured to store a phase of the turret drive source when a phase of the turret coincides with a tool indexing reference phase in a state where there is no difference between a phase of the turret recognized by the controller and an actual phase of the turret; and an output stop unit configured to stop transmission of an output from the turret drive source to the turret, wherein the turret drive source is stopped when the phase of the turret coincides with the tool indexing reference phase and, in a state where the transmission of an output to the turret is stopped by the output stop unit, the turret drive source is indexed to a phase in which the phase of the turret coincides with the tool indexing reference phase.

A reference phase of the turret drive source corresponding to the turret indexing reference phase in a state where there is no difference between the phase of the turret recognized by the controller and actual phase of the turret is stored, and actual phase of the turret is indexed to the indexing reference phase. Then, with the output of the turret drive source kept from being transmitted to as the power for turning the turret, the phase of the turret drive source is indexed to the reference phase of the turret drive source, whereby the phase of the turret recognized by the machine tool and actual phase of the turret can be automatically made to coincide with each other.

With the above configuration, there can be provided a tool exchanger capable of easily making a difference between the phase of the turret recognized by the controller and actual phase of the turret coincide with each other.

BRIEF DESCRIPTION OF THE DRAWINGS

The above and other objects and features of the present invention will become apparent from the following description made with reference to the accompanying drawings, in which:

FIG. 4 is a flowchart employed in a second embodiment, illustrating a processing flow of detecting the load variation of the turret drive source during turning of the turret and detecting the turret indexing reference phase;

FIGS. 5A and 5B are views illustrating a relationship between the turret and the turret drive source in a third embodiment;

FIGS. 8A and 8B are views illustrating a relationship between the turret drive source and the turret in a fifth embodiment; and FIG. 9 is a view illustrating an example of a variation of a load applied to the turret drive source during turning of the turret in the fifth embodiment.

DETAILED DESCRIPTION OF THE PREFERRED EMBODIMENTS

First Embodiment

Figure 1A:
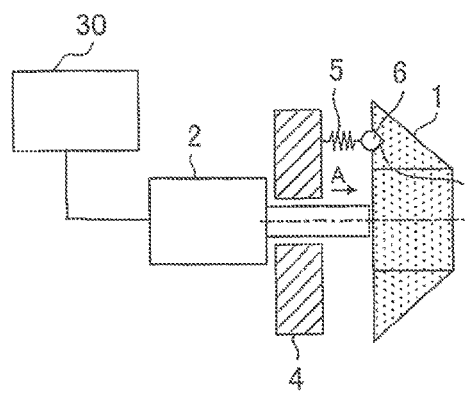
FIGS. 1A and 1B are views illustrating a relationship between a turret drive source and a turret in a first embodiment.
Figure 1B:
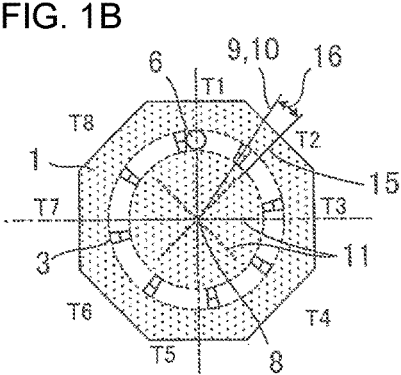

FIG. 1 is a view illustrating a relationship between a turret drive source and a turret in a first embodiment. In FIG. 1, (a) shows a side view, and (b) shows a front view of the turret as viewed from the turret drive source side, as indicated by an arrow A. In FIG. 1, a reference numeral 1 denotes a turret, and a reference numeral 2 denotes a turret drive source that drives the turret 1. The turret 1 and the turret drive source 2 are connected to each other through a transmitting mechanism with a fixed portion 4 interposed therebetween.

The turret 1 is configured to be rotatable centered on a turning center 8 both in left and right directions, and T1, T2, T3, . . . each indicate a phase in which a tool can be transferred between a main shaft and the turret. A reference numeral 15 indicates a desired phase in which the turret 1 is desired to be indexed. A reference numeral 11 indicates a phase in which the tool can be transferred between the main shaft and the turret 1.

A ball 6 is pressed against a surface of the turret 1 that faces the turret drive source 2 by a spring 5 fixed, at its end portion, to the fixed portion 4. The ball 6 is pressed at one position of the turret 1 in the side view; however, as illustrated in the front view, when the turret 1 is rotated, the ball 6 moves in a circumferential direction between two dotted circles while pressing the turret 1. Further, eight grooves 3 are formed so as to equally divide the circumferential path on the turret 1 along which the ball 6 moves into eight.

When the turret 1 is brought into turning operation by power from the turret drive source 2, the ball 6 moves along the circumferential path while pressing the turret 1 and passes the groove 3 in the course of the movement. While the ball 6 is situated on a portion other than the groove 3, a constant load is applied to the turret drive source 2 by a friction force between the ball 6 and the turret 1.

When passing through the groove 3, the ball 6 gets into the groove 3, and the spring 5 extends. When being situated at a position overlapping the groove 3, the ball 6 moves following a shape of the groove 3 and, correspondingly, the spring 5 extends and then contracts. When the ball 6 gets out of the groove 3, the spring 5 contracts. In the course of the movement, when the spring 5 extends, the ball 6 applies a force to the turret 1 in a direction same as a turning direction of the turret 1, resulting in a reduction in the load applied to the turret drive source 2. On the other hand, when the spring 5 contracts, a force for contracting the spring 5 is applied from the turret 1 to the spring 5 through the ball 6, and a reaction force thereof acts in such a direction as to meet with resistance against the turning of the turret 1. As a result, the load applied to the turret drive source 2 is increased.

Figure 2:
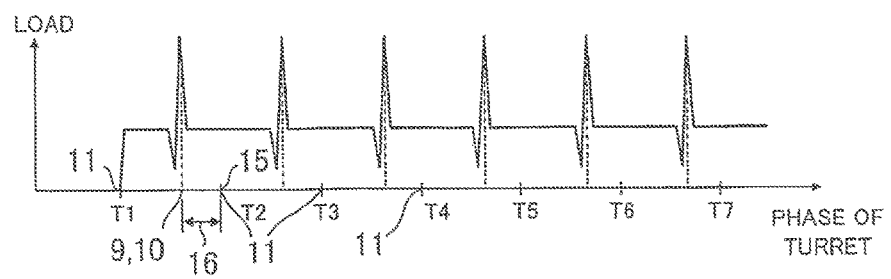
FIG. 2 is a view illustrating an example of a variation of a load applied to the turret drive source during turning of the turret in the first embodiment.

Thus, when the turret 1 is brought into turning operation by the turret drive source 2, the load applied to the turret drive source 2 varies at positions where the ball 6 overlaps the groove 3, as illustrated in FIG. 2. By detecting the variation of the load of the turret drive source 2, an actual position of the turret 1 can be detected. Specifically, a difference 16 between a turret indexing reference phase 10 corresponding to a position where the ball 6 overlaps the groove 3 and a desired phase 15, in which the turret 1 is indexed, recognized by the turret drive source 2.

The following describes a method of detecting the variation of the load of the turret drive source 2 which is generated by a mechanism that varies the load of the turret drive source 2 and detecting the turret indexing reference phase 10.

Figure 10:
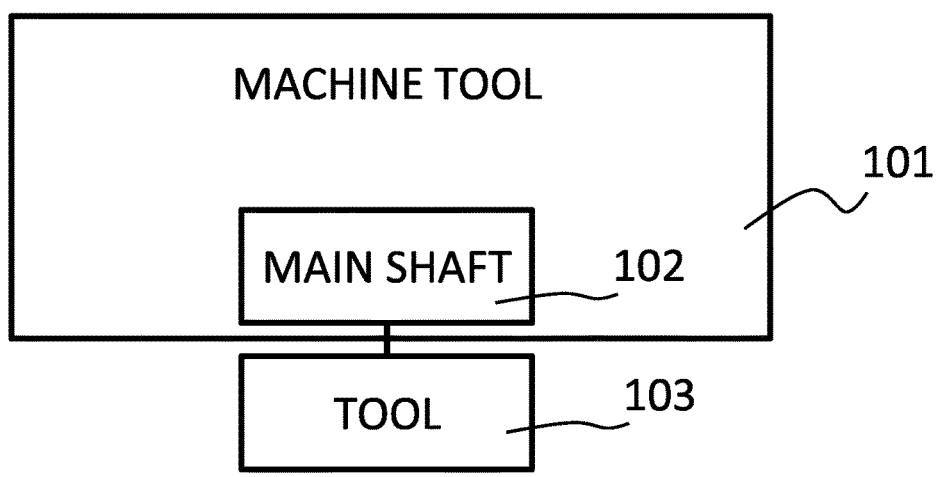
FIG. 10 is a schematic view of a machine tool having a main shaft and a tool mounted to the main shaft.

The turret drive source 2 is controlled in terms of output power by a controller 30 of a machine tool so as to turn the turret 1 at a specified speed set by the machine tool controller. As schematically shown in FIG. 10, a machine tool 101 has a main shaft 102 and a tool 103 mounted to the main shaft 102.

For example, when the turning speed is lower than the specified value, the output power is increased; when the turning speed is higher than the specified value, the output power is suppressed. In this manner, the controller controls the turning speed of the turret 1 to the specified value.

Thus, when the resistance against the turning operation of the turret 1 become small, the output power of the turret drive source 2 is reduced; when the resistance against the turning operation of the turret 1 become large, the output power of the turret drive source 2 is increased.

In the mechanism illustrated in FIG. 1, when the ball 6 gets into or gets out of the groove 3 by the turning operation of the turret 1, the load applied during the turning operation of the turret 1 to the turret drive source 2 varies. According to the variation, a command value from the machine tool controller to the turret drive source 2 changes to change a current value to be supplied to the turret drive source 2. By detecting the change in the command value or current value to be input to the turret drive source 2, a phase 9 in which the load of the turret drive source 2 exceeds a predetermined value due to presence of the groove 3 can be detected as the turret indexing reference phase 10.

Figure 3:
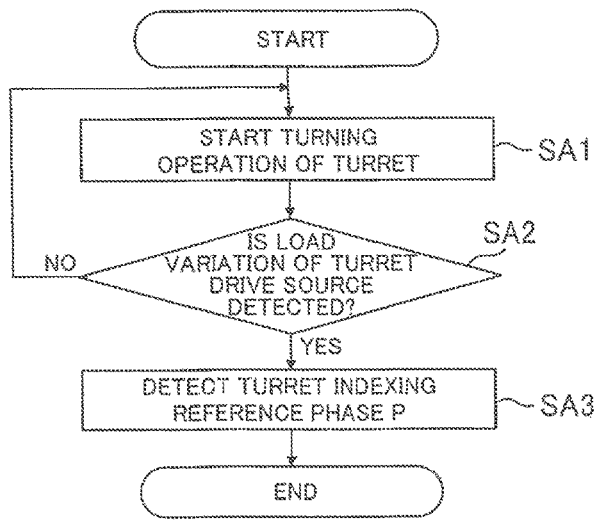
FIG. 3 is a flowchart employed in the first embodiment, illustrating a processing flow of detecting the load variation of the turret drive source during turning of the turret and detecting a turret indexing reference phase.

Based on a flowchart of FIG. 3, the above operation will be described in the following steps.

(Step SA1) The turning operation of the turret is started.

(Step SA2) It is determined whether or not a load variation of the turret drive source is detected. When the load variation is detected (YES), a processing flow advances to step SA3, while the load variation is not detected (NO), the processing flow returns to step SA1.

(Step SA3) The turret indexing reference phase is detected.

Figure 11:
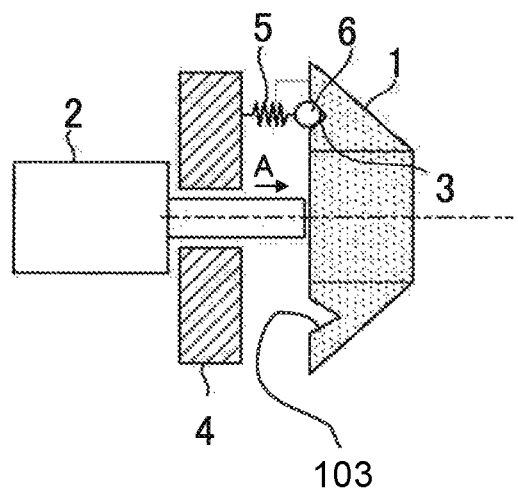
FIGS. 11 and 12 are views illustrating various groove configurations in accordance with some embodiments.
Figure 12:
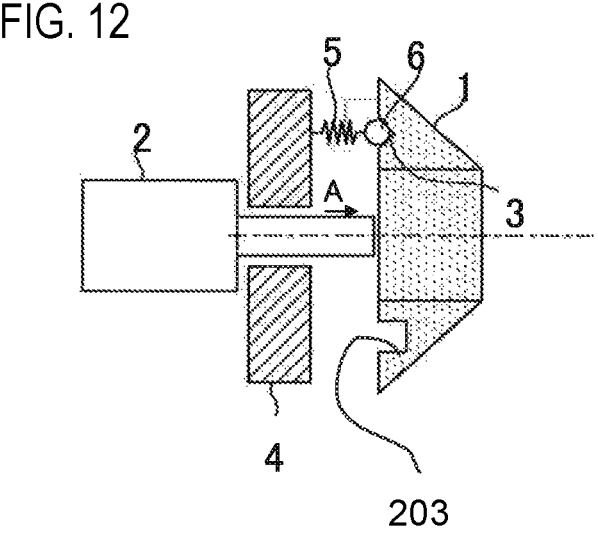

The arrangement of the grooves 3 illustrated in FIG. 1 is merely illustrative, and the grooves 3 need not always be formed at equal intervals on the circle, but may be formed at different intervals. Further, although the grooves 3 have the same depth and same shape in the example of FIG. 1, they may have different depths and shapes from each other, as shown in FIGS. 11-12. Specifically, as shown in FIG. 11, a groove 103 has a different depth from that of the groove 3. Further, as shown in FIG. 12, a groove 203 has a different shape from that of the groove 3. Further, in order to make a friction coefficient of the groove 3 different from that of a portion other than the groove 3, a surface roughness, a material, or surface treatment of the groove 3 may be changed, whereby a manner of variation of the load applied to the turret drive source 2 can be changed.

A peak-shaped convex portion may be formed in place of the groove 3. Also in this case, the load to be applied to the turret drive source 2 can be changed. Further, a roller may be used in place of the ball 6, or a cantilever having a support end at the fixed portion side may be used in place of the spring 5 and the ball 6 to press a portion corresponding to the concentric circles. Also in this case, the load to be applied to the turret drive source 2 can be changed.

Second Embodiment

In a second embodiment, the turret indexing reference phase detected in the first embodiment is stored.

First, the turret indexing reference phase 10 is detected. To this end, a load variation of the turret drive source 2 generated by the mechanism as illustrated in FIG. 1 is detected. The load variation of the turret drive source 2 generated by the mechanism as illustrated in FIG. 1 occurs at the same phase in each time with respect to a phase of the turret 1, so that the detected phase can be used as a reference for indexing the turret 1.

There are stored, in the machine tool controller, a phase α of the turret drive source when the indexing reference phase of the turret 1 coincides with the actual phase of the turret in a state where there is no difference between a phase of the turret recognized by the machine tool and the actual phase of the turret and a phase α' of the turret drive source 2 when the turret indexing reference phase detected in the mechanism illustrated in FIG. 1 coincides with the actual phase of the turret 1.

Further, in a case where a target value of the phase of the turret drive source 2 when the turret 1 is indexed to a given phase θ is β, the machine tool controller outputs a target value represented by β−α+α' to the turret drive source 2, whereby it is possible to automatically make the phase of the turret 1 recognized by the machine tool controller and actual phase of the turret 1 coincide with each other.

More in detail, α=α' is satisfied in the state where no difference exists between the phase of the turret 1 recognized by the machine tool and the actual phase of the turret 1, so that the machine tool controller outputs a target value represented by β to the turret drive source 2.

When the phase α' of the turret drive source 2 when the turret indexing reference phase detected in the mechanism illustrated in FIG. 1 coincides with the actual phase of the turret 1 is detected after the phase of the turret 1 recognized by the machine tool controller and actual phase of the turret 1 deviate from each other, α is equal to α', so that the machine tool controller outputs a target value represented by β−α+α' to the turret drive source 2. A difference between the phase of the turret recognized by the machine tool and actual phase of the turret is corrected by the term of "−α+α'", so that it is possible for the machine tool controller to automatically make the phase of the turret 1 recognized by the machine tool and actual phase of the turret 1 coincide with each other.

Based on a flowchart of FIG. 4, the above operation will be described in the following steps.

(Step SB1) The turret indexing reference phase is detected.

(Step SB2) The phase α' of the turret drive source corresponding to the turret indexing reference phase is stored.

(Step SB3) The phase α of the turret drive source corresponding to the turret indexing reference phase in a state where there is no difference between the phase of the turret recognized by the machine tool and the actual phase of the turret and phase α' of the turret drive source corresponding to the turret indexing reference phase, which are stored in a data storage section of the machine tool controller, are used to set the target value of the phase of the turret drive source when the turret is indexed to a given phase β as a target value represented by β−α+α' for control of the turret drive source.

Although the phases are stored in the machine tool controller in the above example, it may be stored in a tool exchanger.

Third Embodiment

In a third embodiment, when there is a difference between the phase of the turret drive source corresponding to the turret indexing reference phase and phase of the turret drive source corresponding to the turret indexing reference phase in a state where there is no difference between the phase of the turret recognized by the machine tool and the actual phase of the turret, the power output from the turret drive source to the turret is stopped, and the turret drive source is rotated by the phase difference.

First, the turret indexing reference phase 10 is detected. To this end, the load variation of the turret drive source 2 generated by the mechanism as illustrated in FIG. 1 is detected. The load variation of the turret drive source 2 generated by the mechanism as illustrated in FIG. 1 occurs at the same phase in each time with respect to the phase of the turret 1, so that the detected phase can be used as the reference for indexing the turret 1.

There are stored, in the machine tool controller, the phase α of the turret drive source when the indexing reference phase of the turret 1 coincides with the actual phase of the turret in a state where there is no difference between a phase of the turret recognized by the machine tool and the actual phase of the turret and phase α' of the turret drive source 2 when the turret indexing reference phase detected in the mechanism illustrated in FIG. 1 coincides with the actual phase of the turret 1.

Thereafter, when the actual phase of the turret and phase of the turret recognized by the machine tool controller deviate from each other, the phase α' of the turret drive source 2 when the turret indexing reference phase detected in the mechanism illustrated in FIG. 1 coincides with the actual phase of the turret 1 is stored in the machine tool controller.

Then, with the power output from the turret drive source 2 is kept from being transmitted as the power for the turning of the turret, the phase of the turret drive source 2 is changed by −(α'−α). Then, when the power output is transmitted as a power for turning the turret 1, the phase of the turret recognized by the machine tool controller and actual phase of the turret can be automatically made to coincide with each other by the machine tool controller.

Figure 6A:
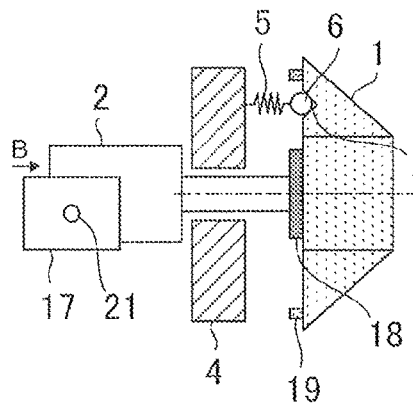
FIGS. 6A and 6B are views illustrating a relationship between the turret and the turret drive source in the third embodiment.
Figure 6B:
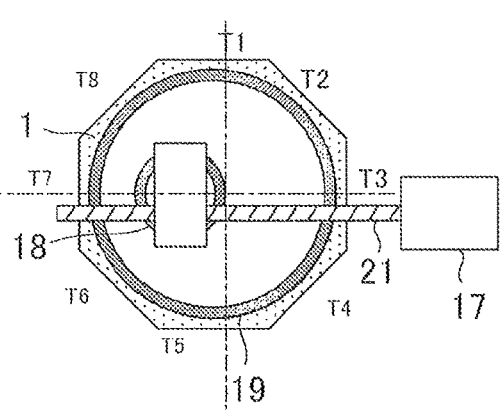

The following describes a concrete mechanism of the present embodiment. FIGS. 5, and 6 are views each illustrating a relationship between the turret and the turret drive source in the present embodiment. FIGS. 5A and 5B illustrate a state where the power of the turret drive source can be transmitted to the turret, and FIG. 6 illustrates a state where the power of the turret drive source is not transmitted to the turret. In FIG. 5, and FIG. 6, a reference numeral 18 is a gear provided in the turret drive source 2, a reference numeral 19 denotes a gear provided in the turret 1, a reference numeral 21 is a ball screw for driving the turret drive source 2, and a reference numeral 17 denotes a drive source for driving the ball screw 21. Other configurations are the same as those illustrated in FIG. 1, so descriptions thereof are omitted here.

In the state illustrated in FIG. 5, the gear 19 of the turret 1 and gear 18 of the turret drive source 2 are moved by the drive source 17 to a position where they are engaged with each other. Thus, the power of the turret drive source 2 is transmitted to the turret 1, bringing the turret 1 into turning operation.

Thereafter, the gear of the turret drive source 2 is moved to a position where it is not engaged with the gear 19 of the turret 1 by the drive source 17, thereby keeping the output of the turret drive source 2 from being transmitted as the power for the turning of the turret, and the phase of the turret drive source 2 is changed by −(α'−α). Then, the gear of the turret drive source 2 is moved by the drive source 17 once again to a position where it is engaged with the gear 19 of the turret 1, allowing the output of the turret drive source 2 to be transmitted as the power for turning of the turret 1.

The mechanism illustrated in FIGS. 5, and 6 is illustrative, and a friction wheel or a belt may be used in place of the gear as the power transmission mechanism. Further, a configuration of the gear train is not limited to the configuration, as illustrated in FIG. 5 and FIG. 6, in which the gears are engaged with each other at an inner periphery of the turret 1, but the gear train may have any configuration.

Further, the gears used in the present invention need not be spur gears, and any gears, such as helical gears or bevel gears, may be used as long as they can be engaged with each other. Further, the mechanism for moving the turret drive source 2 is not limited to one that moves the turret drive source 2 in a direction parallel to a shaft, but the mechanism may move the turret drive source 2 in a direction angled relative to the shaft. Further, although the mechanism moves the turret drive source 2 side in the above example, it may move the turret 1 side so as to bring the gears into engagement or release the engagement therebetween.

Also in the present embodiment, the phases may be stored not in the machine tool, but in the tool exchanger.

Fourth Embodiment

In a fourth embodiment, when the actual phase of the turret coincides with the tool indexing reference phase, the power output from the turret drive source to the turret is stopped, and the turret drive source is indexed to a turret drive source reference phase. As a mechanism that switches whether or not to transmit the power output from the turret drive source to turret, the same mechanism as descried in the third embodiment can be used.

First, the turret indexing reference phase 10 is detected. To this end, the load variation of the turret drive source 2 generated by the mechanism as illustrated in FIG. 1 is detected. The load variation of the turret drive source 2 generated by the mechanism as illustrated in FIG. 1 occurs at the same phase in each time with respect to the phase of the turret 1, so that the detected phase can be used as the reference for indexing the turret 1.

There is stored, in the machine tool controller, the phase α of the turret drive source when the indexing reference phase of the turret 1 coincides with the actual phase of the turret in a state where there is no difference between a phase of the turret recognized by the machine tool and the actual phase of the turret.

Thereafter, when the actual phase of the turret and phase of the turret recognized by the machine tool controller deviate from each other, the turret indexing reference phase detected in the mechanism illustrated in FIG. 1 is detected, and operation of the turret drive source is stopped at a position where the turret indexing reference phase is detected.

Then, with the power output from the turret drive source 2 is kept from being transmitted as the power for the turning of the turret, the phase of the turret drive source 2 is changed to the stored phase α. Then, when the power output is transmitted as a power for turning the turret 1, the phase of the turret recognized by the machine tool controller and actual phase of the turret can be automatically made to coincide with each other by the machine tool controller.

Also in the present embodiment, the phases may be stored not in the machine tool controller, but in the tool exchanger.

Figure 7:
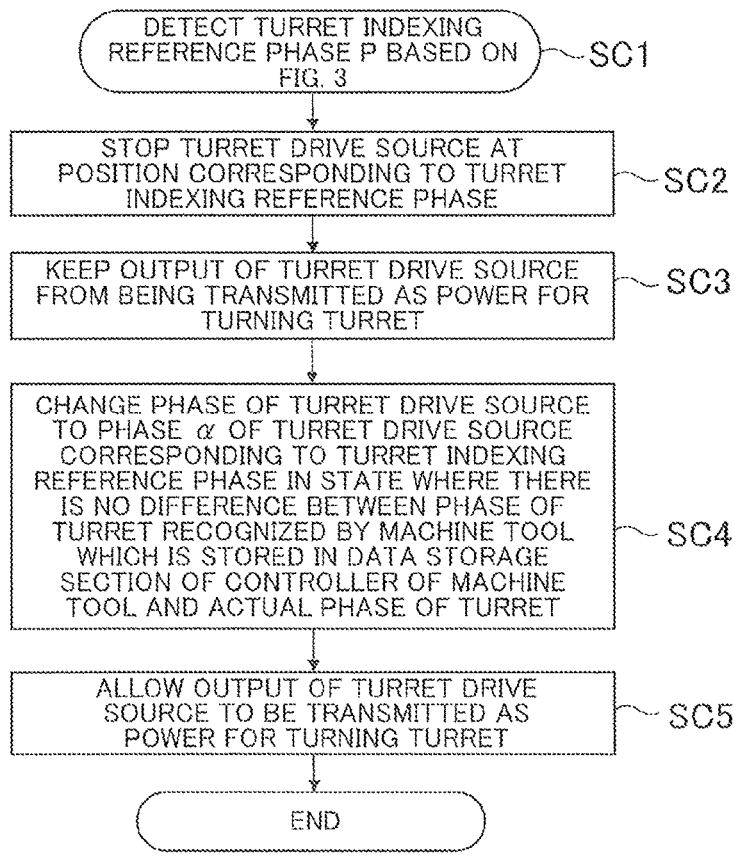
FIG. 7 is a flowchart employed in a fourth embodiment, illustrating a processing flow of detecting the load variation of the turret drive source during turning of the turret and detecting the turret indexing reference phase.

Based on a flowchart of FIG. 7, the above operation will be described in the following steps.

(Step SC1) The turret indexing reference phase is detected.

(Step SC2) The turret drive source is stopped at a position corresponding to the turret indexing reference phase.

(Step SC3) The power output of the turret drive source is kept from being transmitted as the power for the turning of the turret.

(Step SC4) The phase of the turret drive source is changed to the phase α of the turret drive source corresponding to the indexing reference phase of the turret in a state where there is no difference between the phase of the turret recognized by the machine tool and the actual phase of the turret.

(Step SC5) The power output of the turret drive source is allowed to be transmitted as the power for turning of the turret.

Fifth Embodiment

FIG. 8 is a view illustrating a relationship between the turret drive source and turret in a fifth embodiment. A difference from the mechanism illustrated in FIG. 1 is that the number of grooves formed in the circumferential path differs depending on the location. Thus, as illustrated in FIG. 9, the load applied to the turret drive source 2 varies at positions where the ball 6 overlaps the groove 3, with the result that the number of load variations differs depending on the location. When there are a plurality of phases in which the load is varied, it is possible to detect the phases while discriminating them from one another.

Sixth Embodiment

In the above first to fifth embodiments, the grooves 3 and the ball 6 are used as the mechanism for periodically generating a variation to vary the load to be applied to the turret drive source 2. In the present embodiment, in place of varying the load to be applied to the turret drive source 2, a vibration is generated in a predetermined phase. The correction for the detected phase and the like are made in the same manner as in the above embodiments. As a mechanism for generating the vibration, a some kind of mechanism for generating the vibration may be separately provided. Alternatively, in place of using the special mechanism for generating the vibration, a vibration generated by natural roughness that the tool exchanger has can be utilized.

More specifically, a vibration meter is separately mounted to the tool exchanger, and a measurement result from the vibration meter is transmitted to the machine tool controller, whereby a phase of the turret when the detected vibration exceeds a predetermined value is detected. Alternatively, a noise meter is separately mounted to the tool exchanger to measure noise generated by the vibration, and a measurement result from the noise meter is transmitted to the machine tool controller, whereby a phase of the turret when the detected vibration exceeds a predetermined value is detected.

Further alternatively, a phase of the turret when the detected vibration exceeds a predetermined value can be detected by detecting a variation of a command value from the machine tool controller or a current value supplied to the drive source by the machine tool controller by the vibration generated by the tool exchanger.

The invention claimed is:

1. A tool exchanger configured to exchange a tool mounted to a main shaft of a machine tool, the tool exchanger comprising:
   a turret;
   a turret drive source configured to turn the turret, wherein an output of the turret drive source is transmittable to the turret to bring the turret into turning operation for tool indexing;
   a load variation mechanism configured to vary a load in an axial direction of the turret drive source in a predetermined phase during the turning operation of the turret; and
   a controller configured to
      detect the load of the turret drive source varied by the load variation mechanism; and set a tool indexing reference phase of the turret based on a detection result, wherein the load variation mechanism comprises:
a fixed member interposed between the turret and the turret drive source;
a first engagement member connected to the fixed member;
a plurality of second engagement members formed in the turret; and
a pressure applying member that applies a pressure to the first engagement member to be engageable with each of the plurality of the second engagement members.

2. The tool exchanger according to claim 1, wherein the controller is further configured to
store a phase of the turret drive source when a phase of the turret coincides with the tool indexing reference phase in a state where there is no difference between the tool indexing reference phase of the turret recognized by the controller and an actual phase of the turret;
calculate a phase difference between (i) the phase of the turret drive source corresponding to the tool indexing reference phase in a state where there is no difference between a phase of the turret recognized by the controller and an actual phase of the turret and (ii) the stored phase of the turret drive source; and
correct the phase difference with respect to a target position when the turret is indexed to the predetermined phase.

3. The tool exchanger according to claim 1, wherein the controller is further configured to
store a phase of the turret drive source when a phase of the turret coincides with a tool indexing reference phase in a state where there is no difference between a phase of the turret recognized by the controller and an actual phase of the turret;
calculate a phase difference between (i) the phase of the turret drive source corresponding to the tool indexing reference phase in a state where there is no difference between a phase of the turret recognized by the controller and an actual phase of the turret and (ii) the stored phase of the turret drive source;
stop transmission of the output of the turret drive source to the turret; and
rotate the turret drive source by the phase difference in a state where the transmission of the output of the turret drive source to the turret is stopped.

4. The tool exchanger according to claim 1, wherein the controller is further configured to
store a phase of the turret drive source when a phase of the turret coincides with the tool indexing reference phase in a state where there is no difference between the tool indexing reference phase of the turret recognized by the controller and an actual phase of the turret; and
stop transmission of the output of the turret drive source to the turret, wherein the turret drive source is stopped when the phase of the turret coincides with the tool indexing reference phase and, in a state where the transmission of the output of the turret drive source to the turret is stopped, the turret drive source is indexed to the stored phase in which the phase of the turret coincides with the tool indexing reference phase.

5. The tool exchanger according to claim 1, wherein the predetermined phase includes a circumferential position of the turret.

6. The tool exchanger according to claim 1, wherein
the first engagement member is a ball,
the pressure applying member is a spring fixed to the fixed member and configured to press the ball against the turret, and
the plurality of second engagement members includes a plurality of grooves formed in the turret and dividing a circumferential path of the ball on the turret, wherein the ball is situated in one of the plurality of grooves or on a portion other than any of the plurality of grooves while the turret rotates.

7. The tool exchanger according to claim 6, wherein the plurality of grooves has a different friction coefficient from that of a portion of the turret other than the plurality of grooves.

8. The tool exchanger according to claim 6, wherein a phase, at which the load of the turret drive source exceeds a predetermined value, is detected as the tool indexing reference phase by detecting a change in a command value or a current value input to the turret drive source.

9. The tool exchanger according to claim 1, further comprising:
a drive source configured to move a gear of the turret drive source to a position where the gear of the turret drive source engages with a gear of the turret, and where a phase of the turret drive source is changed.

10. The tool exchanger according to claim 1, wherein a phase, at which the load of the turret drive source exceeds a predetermined value, is detected as the tool indexing reference phase by detecting a change in a command value or a current value input to the turret drive source.

11. A tool exchanger configured to exchange a tool mounted to a main shaft of a machine tool, the tool exchanger comprising:
a turret;
a turret drive source configured to turn the turret, wherein an output of the turret drive source is transmittable to the turret to bring the turret into turning operation for tool indexing;
a load variation mechanism configured to vary a load in an axial direction of the turret drive source in a predetermined phase during the turning operation of the turret; and
a controller configured to
detect vibration varied in a predetermined phase; and
set a tool indexing reference phase of the turret based on a detection result,
wherein the load variation mechanism comprises:
a fixed member;
a first engagement member connected to the fixed member;
a plurality of second engagement members formed in the turret; and
a pressure applying member that applies a pressure to the first engagement member to be engageable with each of the plurality of the second engagement members.

12. The tool exchanger according to claim 11, wherein the controller is further configured to:
store a phase of the turret drive source when a phase of the turret coincides with the tool indexing reference phase in a state where there is no difference between the tool indexing reference phase of the turret recognized by the controller and an actual phase of the turret;

calculate a phase difference between (i) the phase of the turret drive source corresponding to the tool indexing reference phase in a state where there is no difference between a phase of the turret recognized by the controller and an actual phase of the turret and (ii) the stored phase of the turret drive source; and correct the phase difference with respect to a target position when the turret is indexed to the predetermined phase.

13. The tool exchanger according to claim 11, wherein:
the controller is further configured to:
store a phase of the turret drive source when a phase of the turret coincides with a tool indexing reference phase in a state where there is no difference between a phase of the turret recognized by the controller and an actual phase of the turret;

calculate a phase difference between (i) the phase of the turret drive source corresponding to the tool indexing reference phase in a state where there is no difference between a phase of the turret recognized by the controller and an actual phase of the turret and (ii) the stored phase of the turret drive source;

stop transmission of the output of the turret drive source to the turret; and rotate the turret drive source by the phase difference in a state where the transmission of the output of the turret drive source to the turret is stopped.

14. The tool exchanger according to claim 11, wherein the controller is further configured to:
store a phase of the turret drive source when a phase of the turret coincides with the tool indexing reference phase in a state where there is no difference between the tool indexing reference phase of the turret recognized by the controller and an actual phase of the turret; and stop transmission of the output of the turret drive source to the turret, wherein the turret drive source is stopped when the phase of the turret coincides with the tool indexing reference phase and, in a state where the transmission of the output of the turret drive source to the turret is stopped, the turret drive source is indexed to the stored phase in which the phase of the turret coincides with the tool indexing reference phase.

15. The tool exchanger according to claim 11, wherein the predetermined phase includes a circumferential position of the turret.

16. The tool exchanger according to claim 11, wherein the first engagement member is a ball,
the pressure applying member is a spring fixed to the fixed member and configured to press the ball against the turret, and
the plurality of second engagement members includes a plurality of grooves formed in the turret and dividing a circumferential path of the ball on the turret, wherein the ball is situated in one of the plurality of grooves or on a portion other than any of the plurality of grooves while the turret rotates.

17. The tool exchanger according to claim 11, further comprising:
a drive source configured to move a gear of the turret drive source to a position where the gear of the turret drive source engages with a gear of the turret, and where a phase of the turret drive source is changed.

18. A tool exchanger configured to exchange a tool mounted to a main shaft of a machine tool, the tool exchanger comprising:
a turret;
a turret drive source configured to turn the turret, wherein an output of the turret drive source is transmittable to the turret to bring the turret into turning operation for tool indexing;
a load variation mechanism configured to vary a load in an axial direction of the turret drive source in a predetermined phase during the turning operation of the turret; and
a controller configured to
detect the load of the turret drive source varied by the load variation mechanism; and
set a tool indexing reference phase of the turret based on a detection result,
wherein the load variation mechanism comprises:
a fixed member;
a first engagement member connected to the fixed member;
a plurality of second engagement members formed in the turret; and
a pressure applying member that applies a pressure to the first engagement member to be engageable with each of the plurality of the second engagement members,
wherein
the first engagement member is a ball,
the pressure applying member is a spring fixed to the fixed member and configured to press the ball against the turret, and
the plurality of second engagement members includes a plurality of grooves formed in the turret and dividing a circumferential path of the ball on the turret, wherein the ball is situated in one of the plurality of grooves or on a portion other than any of the plurality of grooves while the turret rotates, and
wherein the plurality of grooves has different depths or shapes from each other.

* * * * *